(12) United States Patent
Feliss et al.

(10) Patent No.: US 7,448,055 B2
(45) Date of Patent: Nov. 4, 2008

(54) DISK ASSEMBLY HAVING INTEGRAL CLAMP AND/OR SPACER

(75) Inventors: Norbert A. Feliss, Sunnyvale, CA (US); Donald Ray Gillis, San Jose, CA (US); Reinhard F. Wolter, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 532 days.

(21) Appl. No.: 10/856,378

(22) Filed: May 28, 2004

(65) Prior Publication Data

US 2005/0264936 A1    Dec. 1, 2005

(51) Int. Cl.
*G11B 17/028* (2006.01)
*G11B 23/03* (2006.01)

(52) U.S. Cl. .................... 720/722; 360/135
(58) Field of Classification Search ................. 360/135; 720/721–723
See application file for complete search history.

(56) References Cited

U.S. PATENT DOCUMENTS

| | | | | |
|---|---|---|---|---|
| 4,710,913 A * | 12/1987 | Matsushima et al. | ........ | 369/280 |
| 4,785,444 A * | 11/1988 | Nakane et al. | .............. | 369/282 |
| 4,787,009 A * | 11/1988 | Takahashi | .................... | 369/282 |
| 4,788,088 A * | 11/1988 | Kohl | .......................... | 428/34.5 |
| 4,885,653 A * | 12/1989 | Kato | .......................... | 360/133 |
| 4,941,066 A * | 7/1990 | Swinburne et al. | .......... | 360/133 |
| 5,051,858 A * | 9/1991 | Jackson et al. | .............. | 360/135 |
| 5,168,385 A * | 12/1992 | Kobayashi et al. | .......... | 359/209 |
| 5,262,899 A * | 11/1993 | Iizuka | ......................... | 359/811 |
| 5,504,735 A * | 4/1996 | Ota et al. | ..................... | 369/282 |
| 5,576,509 A * | 11/1996 | Refouvelet et al. | ........ | 102/202.7 |
| 5,652,838 A * | 7/1997 | Lovett et al. | ................... | 726/30 |
| 6,023,392 A * | 2/2000 | Kim | ......................... | 360/97.01 |
| 6,850,391 B1 * | 2/2005 | Marchon | ..................... | 360/135 |
| 7,196,869 B2 * | 3/2007 | Feliss et al. | ............... | 360/99.12 |
| 2003/0211311 A1 * | 11/2003 | Porter et al. | .............. | 428/318.8 |
| 2005/0086680 A1 * | 4/2005 | Ro et al. | ...................... | 720/721 |
| 2005/0108744 A1 * | 5/2005 | Seomoon | ..................... | 720/722 |

* cited by examiner

*Primary Examiner*—Brian E Miller
(74) *Attorney, Agent, or Firm*—Zilka-Kotab, PC (57) ABSTRACT

A composite disk-clamp assembly including a clamp or spacer of a resilient material coupled to a disk by injection molded plastic so that the clamp forms an integral portion of the disk itself.

20 Claims, 9 Drawing Sheets

DISK ASSEMBLY HAVING INTEGRAL CLAMP AND/OR SPACER

FIELD OF THE INVENTION

The present invention relates to disk drive components, and more particularly, this invention relates to a disk assembly having an integral clamp and/or spacer.

BACKGROUND OF THE INVENTION

A typical disk drive storage system includes one or more magnetic disks which are mounted for co-rotation on a hub or spindle. A typical disk drive also includes a transducer supported by a hydrodynamic bearing which flies above each magnetic disk. The transducer and the hydrodynamic bearing are sometimes collectively referred to as a data head or a product head. A drive controller is conventionally used for controlling the disk drive based on commands received from a host system. The drive controller controls the disk drive to retrieve information from the magnetic disks and to store information on the magnetic disks. An electromechanical actuator operates within a negative feedback, closed-loop servo system to move the data head radially or linearly over the disk surface for track seek operations and holds the transducer directly above a desired track or cylinder on the disk surface for track following operations.

Figure 1:
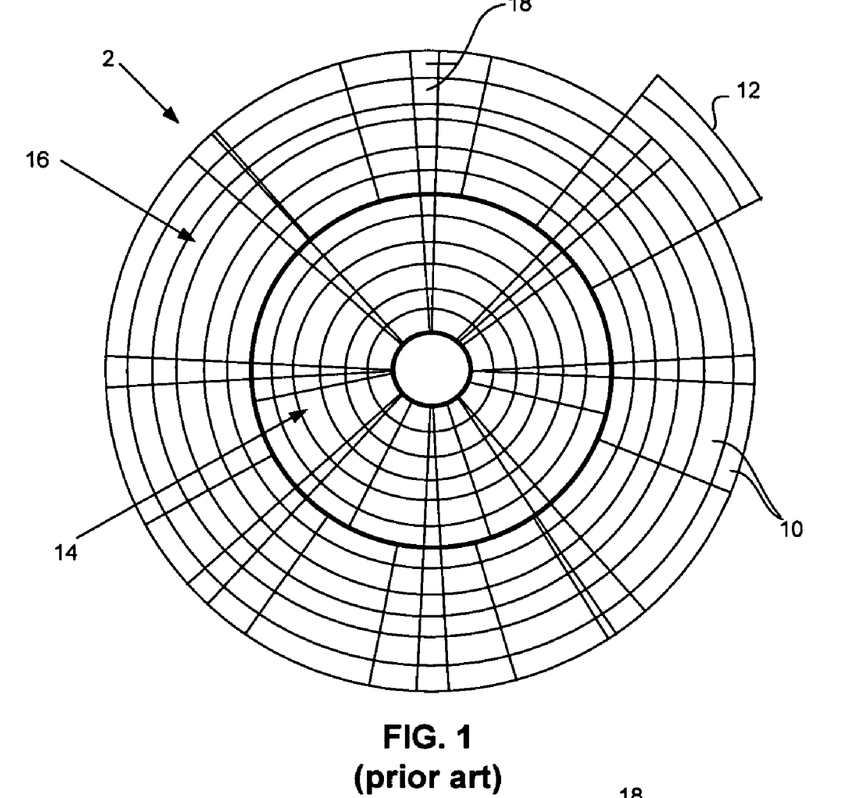
FIG. 1 shows a typical format for of a disk surface comprising a plurality of radially spaced, concentric data tracks partitioned into a number of data sectors and embedded servo sectors for positioning the heads over the disk surfaces while seeking and tracking.
Figure 2:
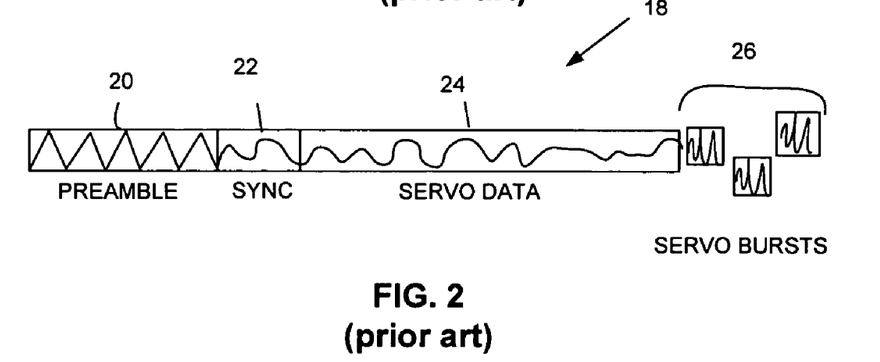
FIG. 2 shows a typical format of an embedded servo sector.

Typically the magnetic disks 2 also comprise servo sectors 18 which are recorded at a regular interval and interleaved with the data sectors 12, as shown in FIG. 1. A servo sector, as shown in FIG. 2, typically comprises a preamble 20 and sync mark 22 for synchronizing to the servo sector; a servo data field 24 comprising coarse position information, such as a Gray coded track address, used to determine the radial location of the head with respect to the plurality of tracks; and a plurality of servo bursts 26 recorded at precise intervals and offsets from the track centerlines which provide fine head position information. When writing or reading data, a servo controller performs a "seek" operation to position the head over a desired track; as the head traverses radially over the recording surface, the Gray coded track addresses in the servo data field 24 provide coarse position information for the head with respect to the current and target track. When the head reaches the target track, the servo controller performs a tracking operation wherein the servo bursts 26 provide fine position information used to maintain the head over the centerline of the track as the digital data is being written to or read from the recording surface.

To ensure that the head remains properly aligned with the data tracks, the disks must be securely attached to the spindle. Current practice is to separate the disks in the stack with spacer rings, and position a spacer ring on top of the disk/spacer stack. Then a top ring, called a clamp, with several apertures is placed over the top spacer ring. The disks are bolted to the spindle via bolts extending through the apertures in the top clamp. Great pressure must be exerted by the bolts on the top clamp in order to prevent slippage of the disks in the event that the drive is bumped or uneven thermal expansion breaks the frictional coupling, because once the disks slip, the drive loses its servo and the data is lost.

A major drawback of the current practice is that when the bolts are tightened, the top clamp and spacer become deformed due to the uneven pressures exerted by the individual bolts. Disks are typically formed from aluminum or glass. Aluminum is more easily deformed, so any external stress can cause deformations to the disk. Glass, too, will deform under uneven stress patterns. The deformation translates out to the disk, creating an uneven "wavy" disk surface, which is most prominent at the inner diameter of the disk. Any unevenness (waviness) on the disk surface compounds the tendency to lose the servo, especially near the inner diameter zone closest to the spacer ring. Further, it has been found that stresses induced on the top disk in the stack transfer down and propagate into some or all of the remaining disks in the stack.

Thus, it would be desirable to reduce or eliminate the need for such forceful attachment to the spindle, with resulting deformation of the disk, while still preventing slippage so that the servo is maintained.

Another issue encountered in the prior art is the high cost of assembling the drives. Each spacer must be placed in the drive and then the top clamp added and bolted down. This process is time consuming and requires either specialized equipment or manpower. To reduce assembly costs, it would be desirable to create the disk itself with an integral top clamp and/or spacer rings so that fewer pieces need to be assembled. This would save a processing step in that only one piece (e.g., disk-spacer composite) need be handled instead of two parts (e.g., disk and spacer ring individually).

SUMMARY OF THE INVENTION

A composite disk-clamp assembly is claimed. The assembly includes a clamp or spacer of a resilient material coupled to the disk by injection molded plastic so that the clamp forms an integral portion of the disk itself. During manufacture, the clamp is positioned at the desired location in relation to the disk. Then the mold is closed to encompass the clamp and possibly a portion of the disk. Molten plastic is injected into the mold and allowed to cool sufficiently that the plastic will not become adversely deformed during subsequent processing steps. The resultant structure is a disk assembly with an integral clamp or spacer that will not radially slip during use in a drive, nor during a catastrophic event such as a drop or impact. Thus, the reliability of the assembly is much greater than was heretofore possible.

Because the disk and clamp and/or spacer are coupled together, a processing step during drive assembly is saved in that only one piece (clamp/spacer-disk composite) need be handled instead of many parts (clamp and spacers and disks). Additional cost savings are realized during manufacture of the clamp and spacers themselves, as it is longer necessary to machine surfaces to obtain a hardness match.

Also advantageously, the assembly can then be clamped to a spindle by a single coupling member (e.g., bolt or screw) extending through the central aperture of the assembly. Thus, multiple screw holes in the clamp and spacers are no longer required, and the resultant waviness is avoided. Also, because the disks are attached to the spindle using only the center hole, the size of the clamp and spacers can be reduced, thereby creating more usable disk surface.

Preferably, the disk and/or clamp and/or spacer have surface features that assist in keeping the molded plastic secure. For instance, a mechanical coupling to the plastic can be achieved by protrusions and corresponding receiving areas such as ridges/textured lines and coincident troughs. The mechanical coupling encourages the various components to expand and contract together, thereby maintaining the proper alignment. The disk and clamp or spacer can be formed or machined to have the desired surface features.

As an option, one or more reinforcing members can be added to the assembly to enhance the strength of the assembly. Also, various performance-enhancing additives may be added to injection molding compounds to accomplish various purposes. For instance, fillers can be added to increase bulk density, plasticizers can be added to improve processability and reduce product brittleness, antioxidants can be added to prevent polymer oxidation, stabilizers can be added to stabilize the polymer against heat or UV light, and reinforcing additives can be added to improve strength.

Any of these embodiments can be integrated into a magnetic storage system.

Additional cost savings would be realized during manufacture of the disk with integral clamp and/or spacer ring, as it would no longer be necessary to machine two surfaces in such a way to match flatness.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
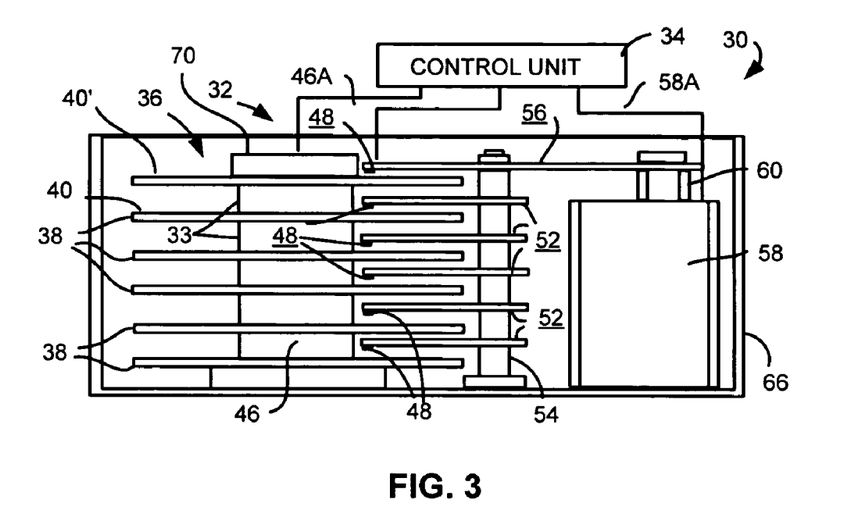
FIG. 3 is a schematic and simplified vertical sectional view of a rigid magnetic disk drive unit embodying the present invention.

Referring now to the drawings wherein like reference numerals designate like or similar parts throughout the several views there is illustrated in FIG. 3 a cross-sectional diagram of parts of a data storage disk drive system 30 including a rigid magnetic disk drive unit generally designated as 32 and a control unit generally designated as 34. While a magnetic disk drive unit is illustrated, it should be understood that other mechanically moving memory configurations may be used. Unit 32 is illustrated in simplified form sufficient for an understanding of the present invention because the utility of the present invention is not limited to the details of a particular drive unit construction. After data storage disk drive system 30 is completely assembled, servo information used to write and read data is written using the disk drive system 30.

Figure 4:
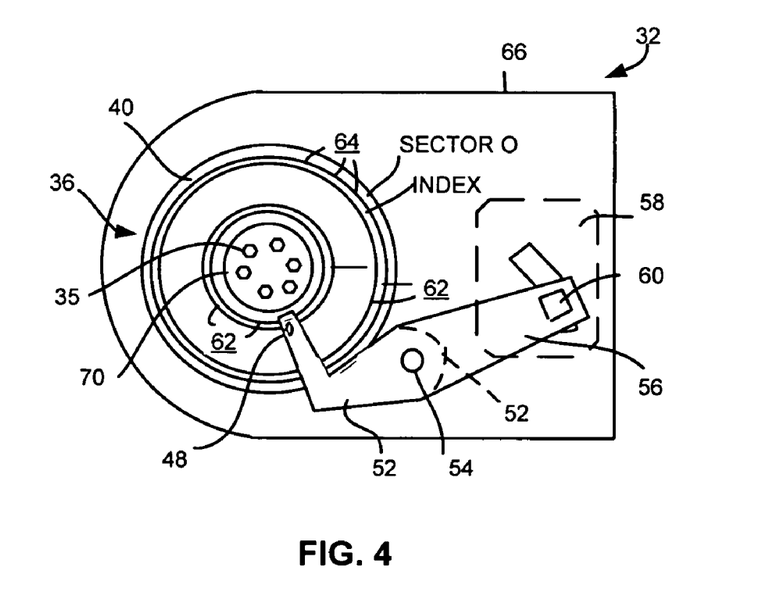
FIG. 4 is a top plan view of the structure shown in FIG. 3.

Referring now to FIGS. 3 and 4 of the drawing, disk drive unit 32 includes a stack 36 of disks 38 having at least one magnetic surface 40. The disks 38 are mounted in parallel for simultaneous rotation on and by an integrated spindle and motor assembly 46. The disks 38 are separated by spacers 33 and are coupled to the spindle at the top by a composite clamp ring 70 which is pressed onto the stack of disks 38 by bolts 35.

Data information on each disk 38 are read and/or written to by a corresponding transducer head 48 movable across the disk surface 40. In a disk drive using a dedicated or hybrid servo, one of the disk surfaces 40' stores servo information used to locate information and data on the other disk surfaces 40.

Transducer heads 48 are mounted on flexure springs 50 carried by arms 52 ganged together for simultaneous pivotal movement about a support spindle 54. One of the arms 52 includes an extension 56 driven in a pivotal motion by a head drive motor 58. Although several drive arrangements are commonly used, the motor 58 can include a voice coil motor 60 cooperating with a magnet and core assembly (not seen) operatively controlled for moving the transducer heads 48 in synchronism in a radial direction in order to position the heads in registration with data information tracks or data cylinders 62 to be followed and access particular data sectors 64. Although a rotary actuator is shown, it should be understood that a disk drive with a linear actuator can be used. Data storage disk drive system 30 is a modular unit including a housing 66. The various components of the disk drive system 30 are controlled in operation by signals generated by control unit 34 such as motor control signals on line 46A and position control signals on line 58A.

Numerous data information tracks 62 are arrayed in a concentric pattern in the magnetic medium of each disk surface 40 of data disks 38. A data cylinder includes a set of corresponding data information tracks 62 for the data surfaces 40 in the data storage disk drive system 30. Data information tracks 62 include a plurality of segments or data sectors 64 each for containing a predefined size of individual groups of data records which are saved for later retrieval and updates. The data information tracks 62 are disposed at predetermined positions relative to servo information, such as a servo reference index. In FIG. 4 one sector 64 is illustrated as SECTOR 0 with a fixed index or mark INDEX for properly locating the first data sector. The location of each next sector 64 is identified by a sector identification (SID) pulse read by transducer heads 48 from surfaces 40, 40'.

Several preferred embodiments are presented below. Note that the implementations described below would work equally well for both spacers and clamps, the spacer being implemented as described instead of the clamp or vice versa.

Figure 5:
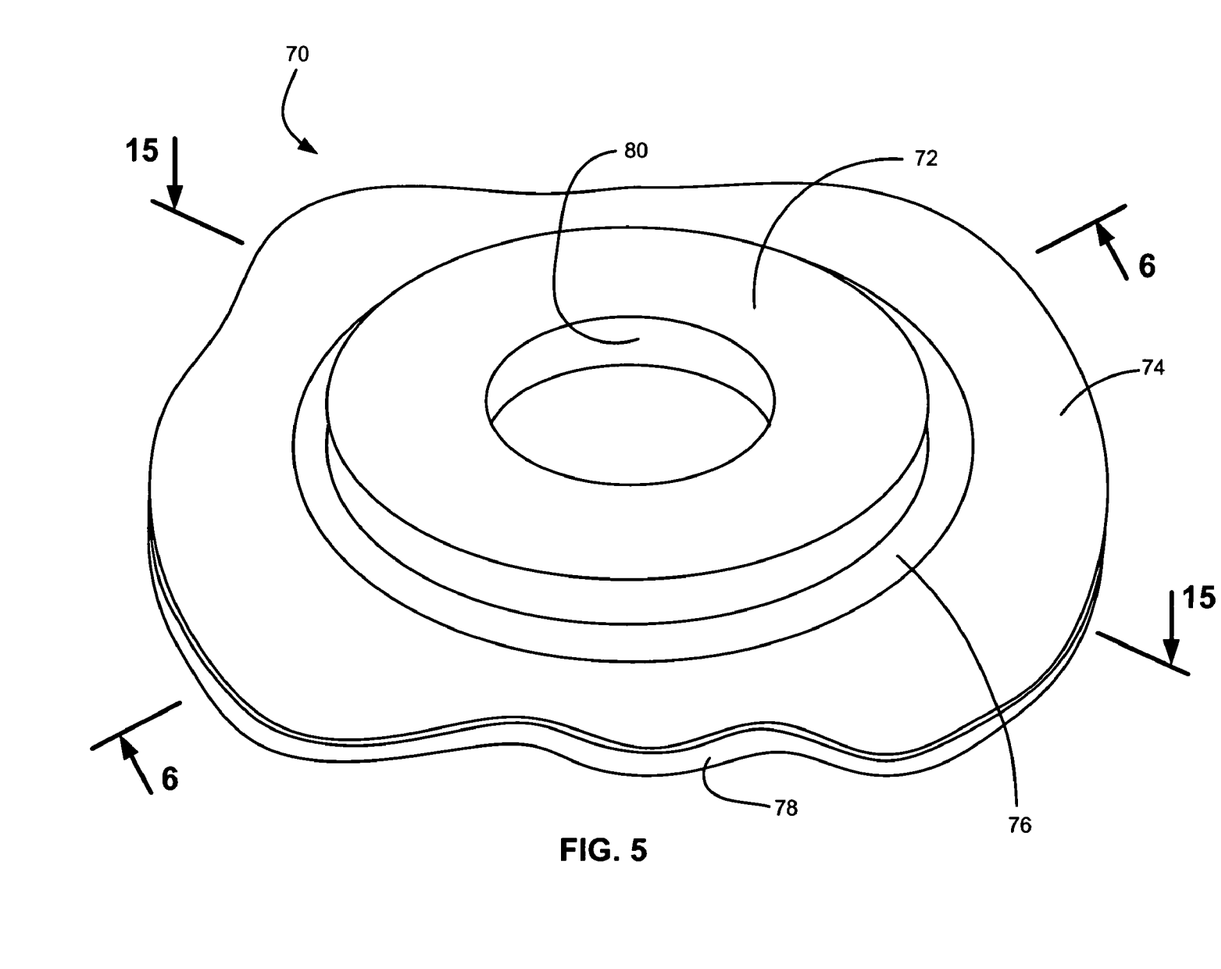
FIG. 5 is a partial perspective view of a composite disk assembly according to one embodiment.

FIG. 5 illustrates a composite disk-clamp assembly 70 according to one embodiment. Note that only a portion of the disk 74 is shown. As shown, a clamp (or spacer) 72 of a resilient material (e.g., metal, ceramic, plastic) is positioned in a central aperture of a disk 74. The clamp 72 is coupled to the disk 74 by injection molded plastic 76 so that the clamp 72 is like an integral portion of the disk 74 itself. In this embodiment, the disk 74 includes a substrate 78 of a traditional material such as glass or aluminum and an overcoat and/or undercoat of material which will ultimately store data. During manufacture, the clamp 72 is positioned at the desired location in relation to the disk 74, and can be held in that position by a part of the injection mold. Then the mold is closed to encompass the clamp 72 and possibly a portion of the disk 74. Molten plastic is injected into the mold and allowed to cool sufficiently that the plastic will not become adversely deformed during subsequent processing steps. The resultant structure is a disk assembly 70 with an integral clamp 72 that will not radially slip during use in a drive, nor during a catastrophic event such as a drop or impact. Thus, the reliability of the assembly 70 is much greater than was heretofore possible.

Because the disk and clamp 72 and/or spacer are coupled together, a processing step during drive assembly is saved in that only one piece (clamp/spacer-disk composite) need be handled instead of many parts (clamp and spacers and disks). Additional cost savings are realized during manufacture of the clamp and spacers themselves, as it is longer necessary to machine surfaces to obtain a hardness match.

Also advantageously, the assembly 70 can then be clamped to a spindle by a single coupling member (e.g., bolt or screw) extending through the central aperture 80 of the assembly 70. Thus, multiple screw holes in the clamp 72 and spacers are no longer required, and the resultant waviness is avoided. Also, because the disks are attached to the spindle using only the center hole, the size of the clamp 72 and spacers can be reduced, thereby creating more usable disk surface.

Preferably, the disk 74 and/or clamp 72 and/or spacer have surface features that assist in keeping the molded plastic 76 secure. For instance, a mechanical coupling to the plastic 76 can be achieved by protrusions and corresponding receiving areas such as ridges/textured lines and coincident troughs. The mechanical coupling encourages the various components to expand and contract together, thereby maintaining the proper alignment. The disk 74 and clamp 72 or spacer can be formed or machined to have the desired surface features.

Figure 6:
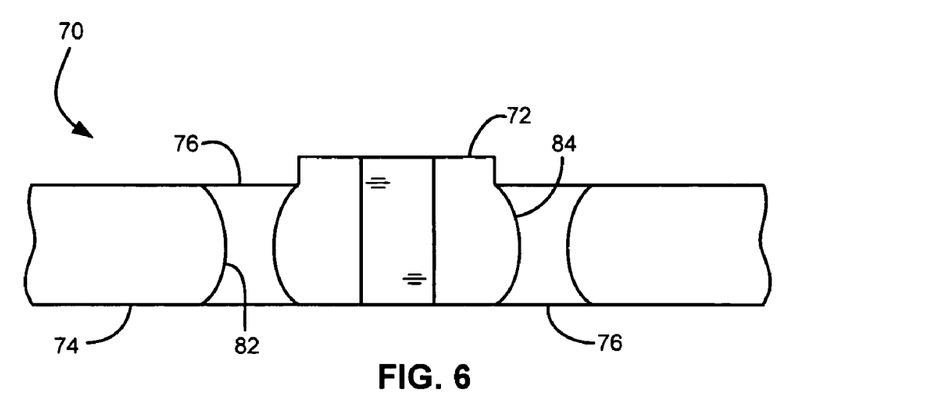
FIG. 6 is a partial cross sectional view of the composite disk assembly of FIG. 5 taken along line 5-5 of FIG. 5.
Figure 7:
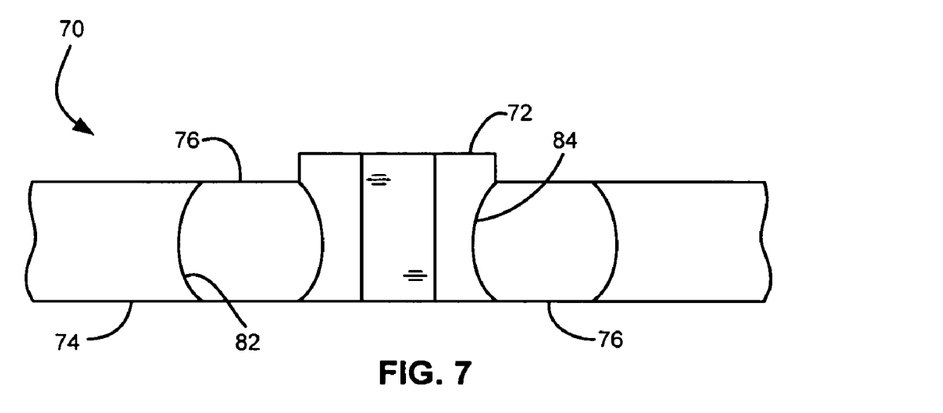
FIG. 7 is a partial cross sectional view of a composite disk assembly according to another embodiment.
Figure 8:
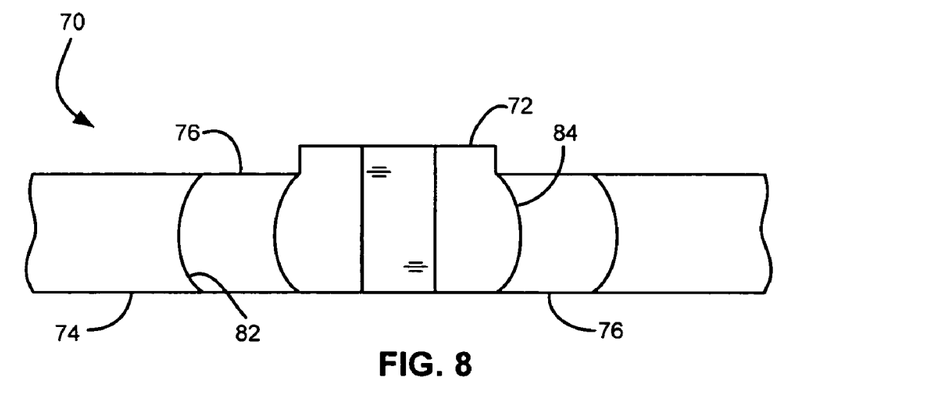
FIG. 8 is a partial cross sectional view of a composite disk assembly having surface features according to another embodiment.
Figure 9:
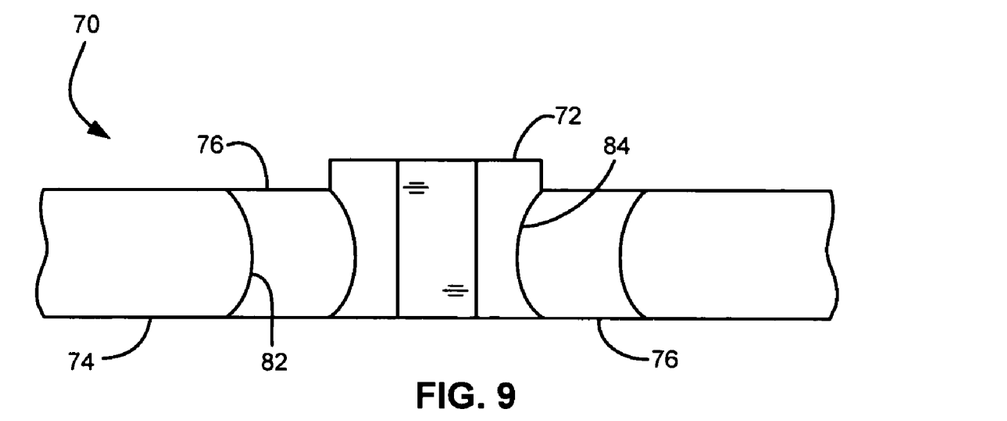
FIG. 9 is a partial cross sectional view of a composite disk assembly having surface features according to another embodiment.
Figure 10:
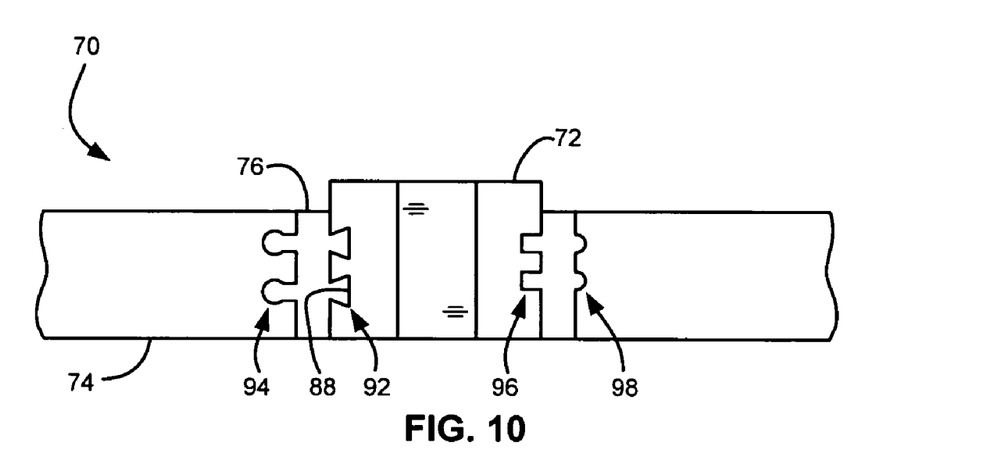
FIG. 10 is a partial cross sectional view of a composite disk assembly having surface features according to another embodiment.
Figure 11:
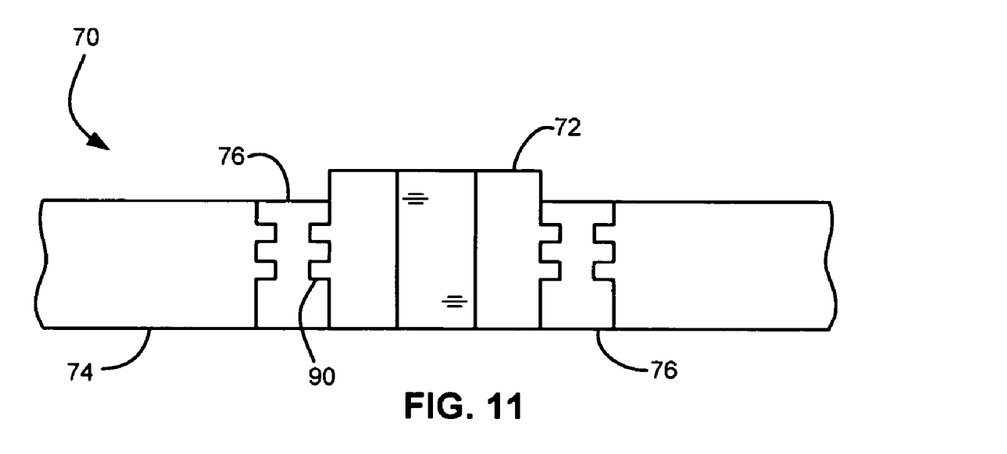
FIG. 11 is a partial cross sectional view of a composite disk assembly having surface features according to another embodiment.
Figure 12:
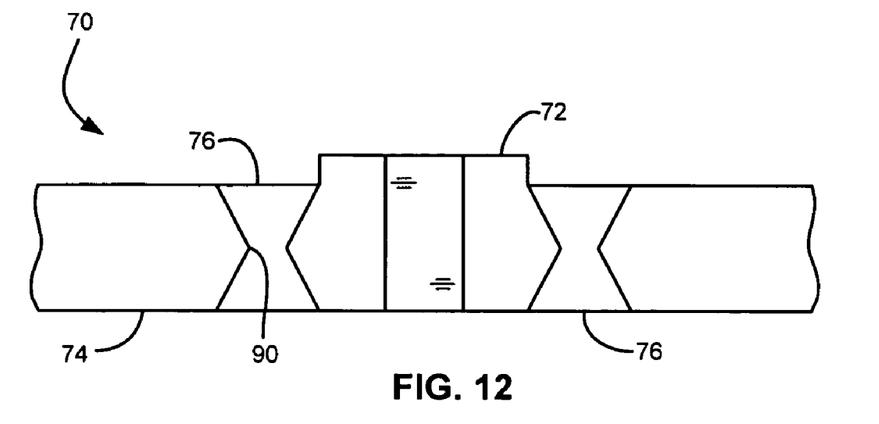
FIG. 12 is a partial cross sectional view of a composite disk assembly having surface features according to another embodiment.

As shown in FIG. 6, the inner peripheral wall 82 of the disk aperture is convexed, as is an outer peripheral wall 84 of the clamp 72 or spacer, giving the molded plastic 76 an hourglass shape. FIG. 7 depicts a variation in which the inner peripheral wall 82 of the disk aperture and outer peripheral wall 84 of the clamp 72 are concaved. FIGS. 8 and 9 illustrate further variations of FIGS. 6 and 7. FIG. 10 illustrates an embodiment where the disk 74 and clamp 72 have one or more depressions 88, e.g., channeling, divots, etc. The plastic 76 then enters the depressions during the molding process. FIGS. 11 and 12 show embodiments where the disk 74 and clamp 72 have one or more peripheral protuberances 90. Preferably, the protrusions and/or depressions have features that provide a locking mechanism. For instance, the depressions in FIG. 10 include dovetailed channels or apertures 92, bulbous channels or apertures 94, rectangular or cylindrical channels or apertures 96, and rounded channels or apertures 98. One skilled in the art will understand how the protuberances can be formed with similar shapes. Variations and combinations of depressions 88 and protrusions 90 can be used.

The present invention is not to be limited to only these surface features, as one skilled in the art will appreciate that many other types of surface features can be used with equal effectiveness.

In the above-described embodiments, the clamp 72 or spacer has been shown to extend beyond the top of the disk 74 and be substantially coplanar with the bottom of the disk 74. This is particularly useful in that the extended portion provides spacing between objects other disks 74 stacked thereon. Thus, the clamp 72 can act as a spacer for other disks. For clamping, the added thickness provides more resistance to deformation of the clamp 72 upon coupling the assemblies 70 to the spindle.

Figure 13:
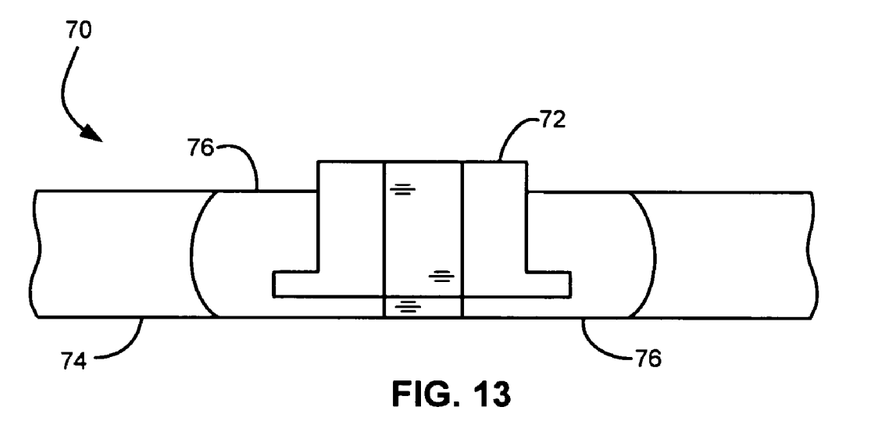
FIG. 13 is a partial cross sectional view of a composite disk assembly where the plastic is molded over a portion of a clamp or spacer.

In another embodiment, shown in FIG. 13, plastic 76 may be molded over the bottom of the clamp 72 or spacer. Similarly, plastic can be molded over a top portion of the clamp 72 or spacer. However, it is worth noting that the clamp 72 need not extend beyond the top or bottom of the disk 74, and can even be slightly recessed. The clamp 72 or spacer can have protrusions or depressions (not shown) on its bottom surface to enhance a physical coupling to the plastic 76.

Figure 14:
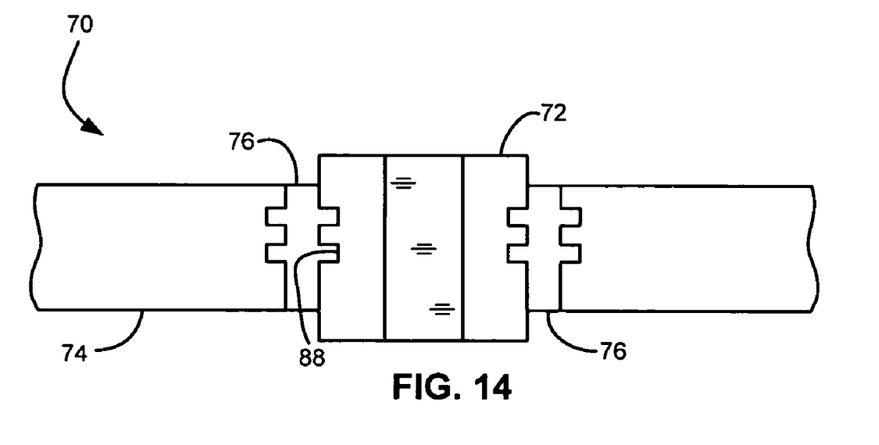
FIG. 14 is a partial cross sectional view of a composite disk assembly where the plastic is molded over a portion of a clamp or spacer.

As shown in FIG. 14, the clamp 72 or spacer can extend beyond both a top and bottom surface of the disk 74. This type of configuration, while useable throughout the drive, is particularly suitable for the bottom disk 74, so that the bottom protruding part of the spacer rests on the spindle bearing while spacing the disk 74 therefrom.

Figure 15:
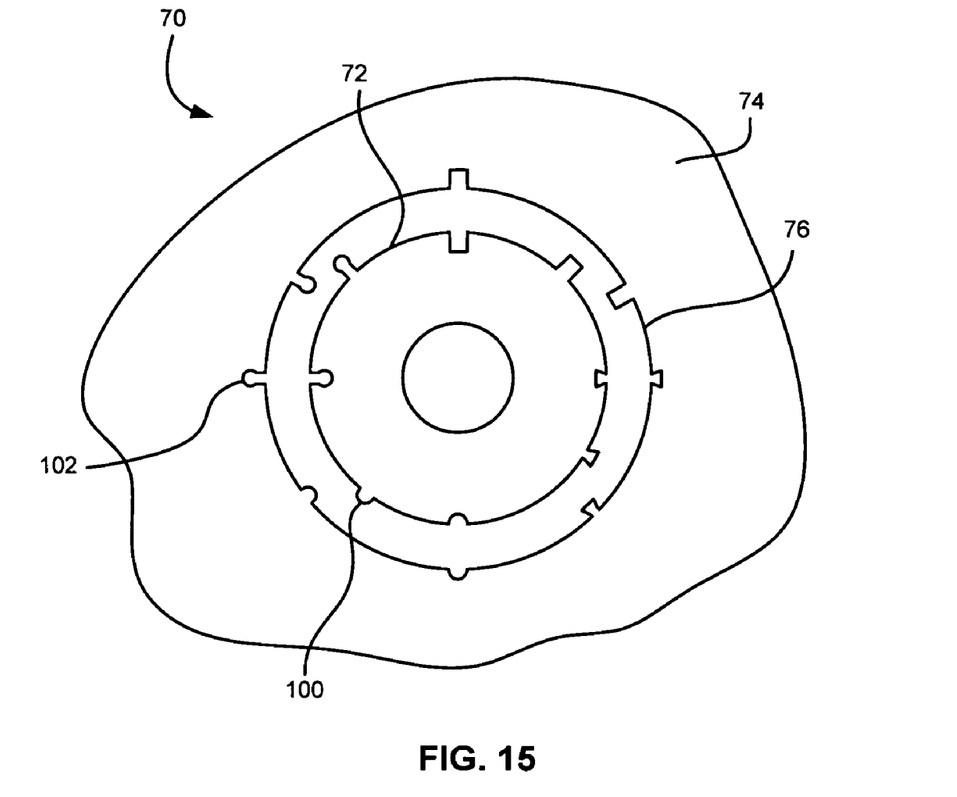
FIG. 15 is a partial side view of a composite disk assembly having protrusions and depressions for preventing rotation of the disk with respect to the clamp or spacer.

As an option, and as best seen in FIG. 15, one or more protrusions 100 and/or depressions 102 can be formed in/on the disk 74 and/or clamp 72 or spacer so that plastic is displaced by the protrusions 100 or flows into the depressions 102, thereby providing a mechanism that prevents rotational slippage of the clamp 72 or spacer in relation to the disk 74. Again, the physical shapes of the protrusions or depressions can vary, and several are shown in FIG. 15.

The plastic material can be advantageously selected to provide a desired amount of compressibility so that when the clamp 72 or spacer expands or deforms due to thermal changes or external pressures (e.g., from the bolt), the plastic 76 is compressed but no deformation of the disk 74 occurs. Preferred resiliently deformable plastic materials are polyethylenes and polyesters.

Figure 16:
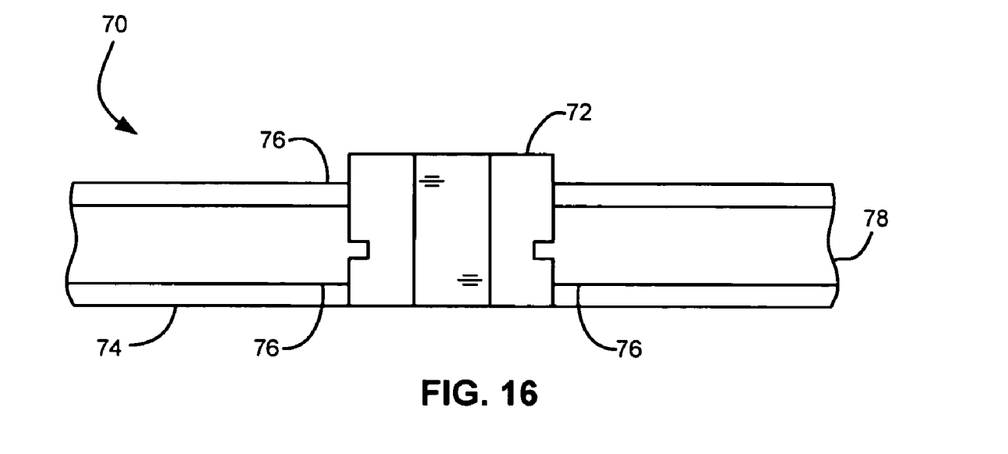
FIG. 16 is a partial cross sectional view of an alternate embodiment of a disk-clamp assembly where the disk substrate is also formed of injection molded plastic material.

FIG. 16 shows an alternate embodiment of the disk-clamp assembly 70 where the disk substrate is also formed of injection molded plastic material 76. As such, the disk 74 substrate can be molded around the clamp 72.

Similarly, the clamp 72 or spacer can be formed by injection molding. In a further embodiment, both the clamp or spacer and the disk substrate can be formed by injection molding.

Figure 17:
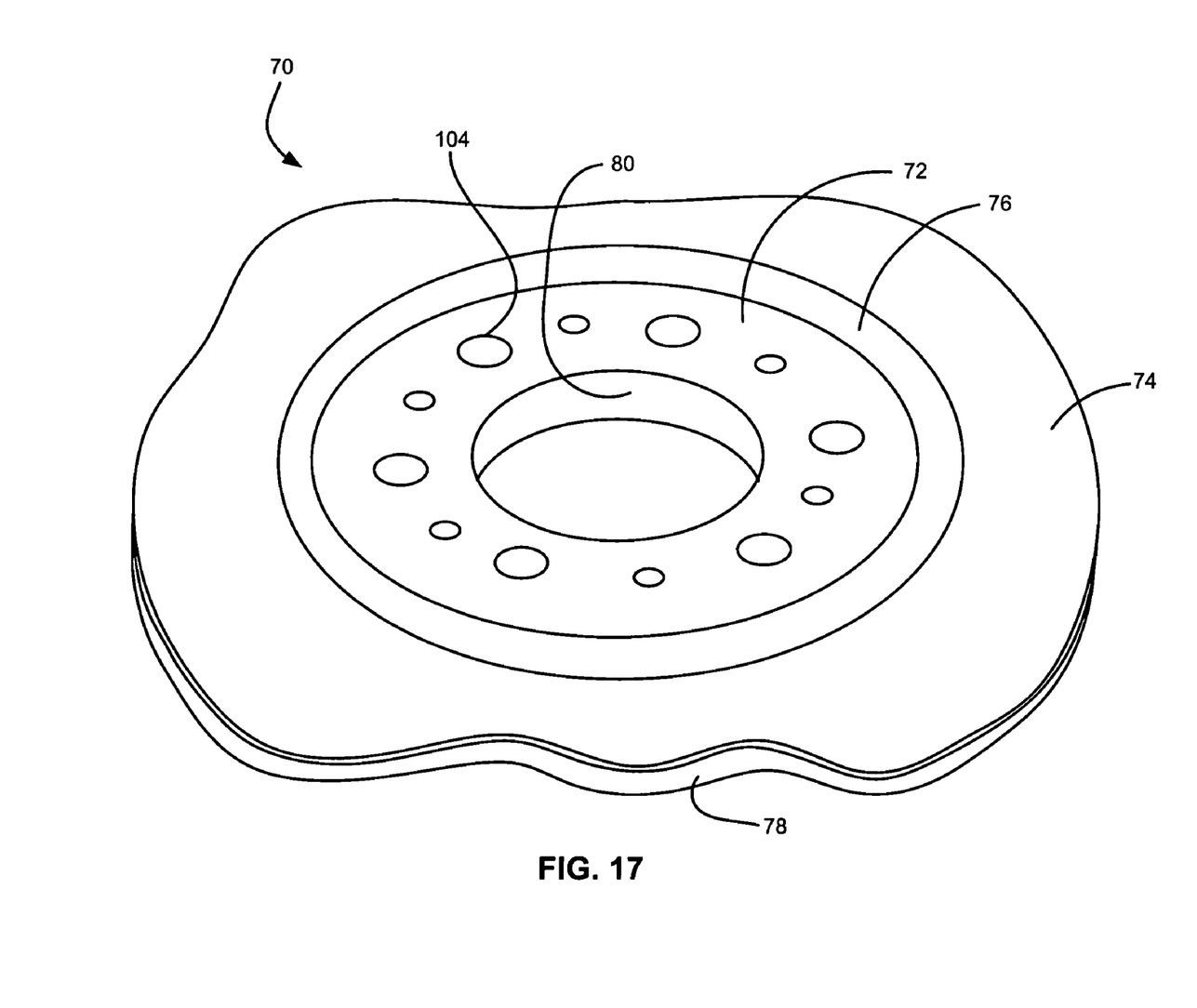
FIG. 17 is a partial perspective view of an embodiment of the composite disk assembly where the clamp or spacer has several apertures extending therethrough for receiving screws, bolts or the like to clamp the assembly to a spindle.

FIG. 17 shows an alternate embodiment of the disk-clamp or disk-spacer assembly 70. As shown the clamp 72 (or spacer) has several apertures 104 extending therethrough for receiving screws, bolts or the like to clamp 72 the assembly 70 to the spindle.

Figure 18:
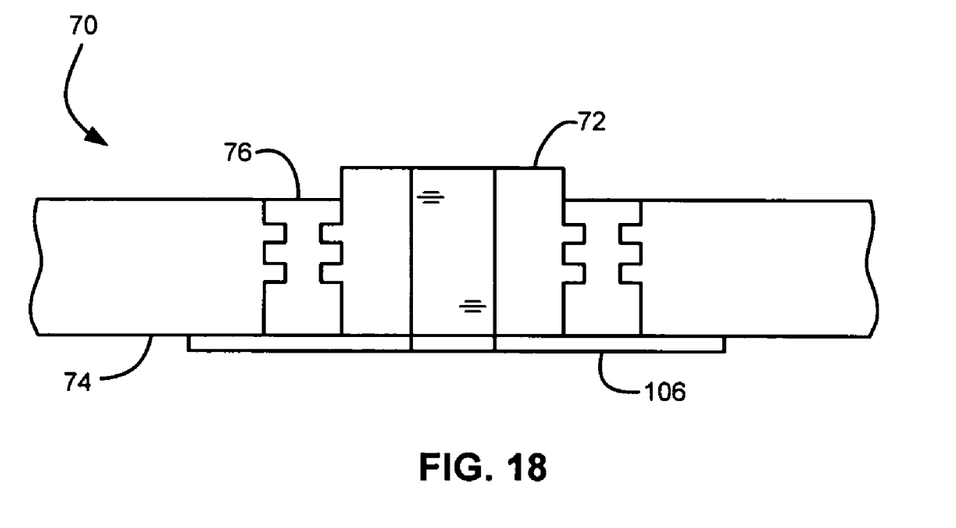
FIG. 18 is a partial cross sectional view of a composite disk assembly having a reinforcing member.

As an option, one or more reinforcing members 106 can be added to the assembly 70 to enhance the strength of the assembly 70. For example, FIG. 18 shows an embodiment where the reinforcing member 106 is a ring that attaches to both the disk 74 and the injection molded plastic and/or the clamp 72 or spacer. The reinforcing member 106 can be coupled to the assembly 70 by any suitable means, such as mechanical bonding, adhesive chemical bonding, and bonding at the molecular level. For instance, adhesives such as silicon-based adhesives can be used to create the chemical bond. In a similar manner, bonding at the molecular level can be achieved by sintering, welding, ultrasonic welding, etc.

According to one illustrative injection molding process, a plastic material is first selected. Polymer materials used in injection molding are typically classified as amorphous, semicrystalline, blends and filled systems. In amorphous polymers, the chains are randomly distributed. Some examples of amorphous polymers are Polycarbonate, Polyphenylene oxide and Acrylonitrile Butadiene Styrene. In a semicrystalline polymer, chains are partially ordered to form crystallites. Some examples of such polymers are Polybutylene terephthalate and Nylon. Engineering polymers are often blends of two or more polymers. Polymers are frequently blended in a twin screw extruder. Fillers such as short glass fibers, coloring agents, fire retardants etc. are frequently added to the polymers to enhance their mechanical properties or other performance characteristics. Semicrystalline polymers have the highest shrinkage followed by blends and amorphous polymers. Systems with fillers have the lowest shrinkage.

Suitable thermoplastic materials useable in the present invention include:

Acrylonitrile butadiene styrene (ABS)
Acetal
Acrylic
Polycarbonate (PC)
Polyester
Polyethylene
Fluoroplastic
Polyimide
Nylon
Polyphenylene oxide
Polypropylene (PP)
Polystyrene (PS)
Polysulphone
Polyvinyl chloride (PVC)
copolymers thereof
mixtures thereof Various performance-enhancing additives may be added to injection molding compounds to accomplish various purposes. For instance, fillers such as calcium carbonate, talc, limestone can be added to increase bulk density. Plasticizers such as phthalate esters, phosphate esters improve processability and reduce product brittleness. Antioxidants such as phenols, aromatic amines prevent polymer oxidation. Stabilizers such as carbon black, hydroxybenzophenone stabilize the polymer against heat or UV light. Reinforcing additives such as E-glass, S-glass, carbon, Kevlar fibers improve strength.

In a preferred embodiment, the plastic has glass beads (or other material strengthening elements) of any shape embedded into the plastic matrix in a non-uniform manner. Preferably, the material strengthening elements are harder than the plastic material. This allows the designer to implement a gradient of density from high to low (high closest to the clamp) which will allow a gradient of thermal expansion to be made more uniform from the stiff clamp to the outer portion of the injection molded plastic. Without this gradient the assembly could suffer from thermal expansion properties as well as modulus problems. The plastic closest to the clamp would have a high density of materials, allowing for a thermal expansion and high modulus closest to the clamp. The portion of the plastic closest to the disk would then have material properties more similar to that of the disk.

The material for the spacer must also be selected. Note that glass and aluminum have a similar Young's modulus, but the aluminum has about 6 times the coefficient of thermal expansion as glass. Therefore, an aluminum spacer is preferred for use with aluminum disks, while a ceramic spacer is preferred for use with glass disks.

In any of these embodiments, the clamp and/or spacer can be a multi-layer (composite) structure. In such an embodiment, at least one layer of the clamp would be stiff to resist deformation upon attachment to the spindle. The spacer may or may not include a stiff layer.

Once the material is selected, the molding cycle is performed. The injection molding cycle can be divided into several stages. They are mold closing, filling, packing, cooling, mold opening and ejection.

A mold having the desired shape of the injection-molded portion of the assembly is selected or created. The clamp or spacer is positioned at the desired location in relation to the disk, and can be held in that position by a part of the mold. Then, in the mold closing step, the mold is closed to encompass the clamp and/or spacer and possibly a portion of the disk. Where the disk substrate is also injection molded, the mold would form the entire disk substrate around the clamp or spacer. Where the clamp or spacer is injection molded, the mold would form the entire disk substrate around the clamp or spacer.

In the filling step, a hot, molten polymer is injected into a cold mold. A screw apparatus can be used to inject the polymer into the mold. A part is "filled" when molten polymer has flowed into all the extremities of the mold.

Packing squeezes more polymer into the mold after filling is finished. The pressure of the melt holds the cavity pressure high. Packing thus takes advantage of the slight compressibility of the melt to push as much polymer into the mold as possible. This is done because cooling introduces shrinkage. Care must be taken to design the mold such that gate freeze-off does not occur too early, because no further packing can occur after gate freeze-off.

Cooling time is typically the major fraction of the total cycle time. Uniform cooling improves part quality by reducing residual stresses and maintaining dimensional accuracy and stability. Cooling time is a function of mold wall temperature, melt temperature, material properties, and part wall thickness.

After the part cools and solidifies, the mold is opened and the part is ejected.

Thus, the composite structure described herein will reduce the parts count and the cost associated with individual disks, clamps and spacer rings. The possible material choices also allow the designer to better account for thermal expansion, stiffness and modulus which are mated and matched to the disk.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a disk; and a clamp or spacer coupled to the disk by injection molded plastic;

wherein the disk has a top and a bottom outer surface extending between a circumferential edge thereof, wherein the clamp or spacer extends in a direction parallel to an axis of the disk beyond all extents of at least one of the top and bottom outer surfaces of the disk in the direction, wherein at least one of the disk and clamp or at least one of the disk and spacer has a surface feature for creating a mechanical coupling with the plastic such that an interface between the plastic and the at least one of the disk and clamp or the at least one of the disk and spacer has a nonlinear cross section.

2. The system as recited in claim 1, wherein the clamp or spacer is oriented towards a central aperture of the disk.

3. The system as recited in claim 2, wherein the system includes a center hole adapted to receive a member therethrough.

4. The composite disk assembly as recited in claim 1, wherein the clamp or spacer extends beyond all extents of both of the top and bottom outer surfaces of the disk in the direction parallel to an axis of the disk.

5. The system as recited in claim 1, wherein at least one side of the clamp or spacer is coplanar with an outer extent of the top or bottom outer surface of the disk.

6. The system as recited in claim 1, wherein a substrate of the disk is formed of injection molded plastic.

7. The system as recited in claim 1, wherein the clamp or spacer is formed of injection molded plastic.

8. The system as recited in claim 1, wherein the plastic has at least one performance-enhancing additive intermixed therewith, the additive being effective to improve a property in the plastic as compared to the plastic without the additive, the property being selected from a group consisting of: bulk density, processability, brittleness, strength, oxidation properties, and stabilization properties relating to heat or UV light.

9. The system as recited in claim 8, wherein the additive is selected from a group consisting of: fillers, plasticizers, antioxidants, stabilizers, reinforcing additives, and material strengthening elements.

10. The system as recited in claim 1, further comprising;
at least one head for reading from and writing to the magnetic media, each head having;
a sensor;
a write element coupled to the sensor:
a slider for supporting the head; and
a control unit coupled to the head for controlling operation of the head.

11. A system, comprising;
a disk having a central aperture;
a clamp or spacer positioned in the central aperture of the disk; and
injection molded plastic coupling the clamp or spacer to the disk;
wherein at least one of the disk and clamp or at least one of the disk and spacer has a surface feature for creating a mechanical coupling with the plastic such that an interface between the plastic and the at least one of the disk and clamp or the at least one of the disk and spacer has a nonlinear cross section;
wherein the disk has a top and a bottom outer surface extending between a circumferential edge thereof, wherein the clamp or spacer extends in a direction parallel to an axis of the disk beyond all extents of at least one of the top and bottom outer surfaces of the disk in the direction.

12. The system as recited in claim 11, wherein the system includes a center hole adapted to receive a member therethrough.

13. The composite disk assembly as recited in claim 11, wherein the clamp or spacer extends beyond extents of both of the top and bottom outer surfaces of the disk in a direction parallel to an axis of the disk.

14. The system as recited in claim 11, wherein at least one side of the clamp or spacer is coplanar with an extent of the top or bottom outer surface of the disk.

15. The system as recited in claim 11, wherein a substrate of the disk is formed of injection molded plastic.

16. The system as recited in claim 11, wherein the clamp or spacer is formed of injection molded plastic.

17. The system as recited in claim 11, wherein the plastic has strengthening elements therein.

18. The system as recited in claim 11, wherein the plastic has at least one performance-enhancing additive added thereto, the additive being effective to improve a property in the plastic as compared to the plastic without the additive, the property being selected from a group consisting of: bulk density, processability, brittleness, strength, oxidation properties, and stabilization properties relating to heat or UV light.

19. The system as recited in claim 11, wherein the clamp or spacer is formed of at least one of a metal and ceramic.

20. The system as recited in claim 11, further comprising:
at least one head for reading, from and writing; to the magnetic media, each head having:
a sensor:
a write element coupled to the sensor;
a slider for supporting, the head; and
a control unit coupled to the head for controlling operation of the head.

* * * * *